No. 699,087. Patented Apr. 29, 1902.
E. KEMPSHALL.
PROCESS OF MANUFACTURING GOLF BALLS.
(Application filed Mar. 12, 1902.)
(No Model.)
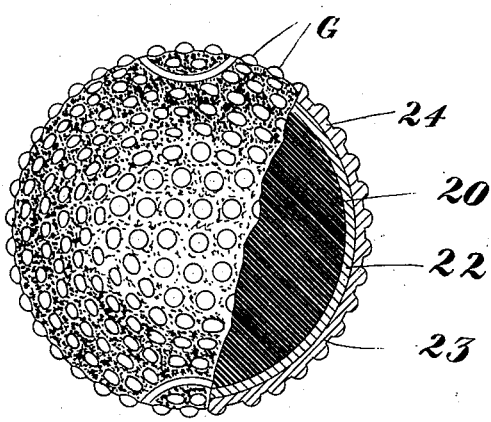
Fig. 1.
Fig. 2.
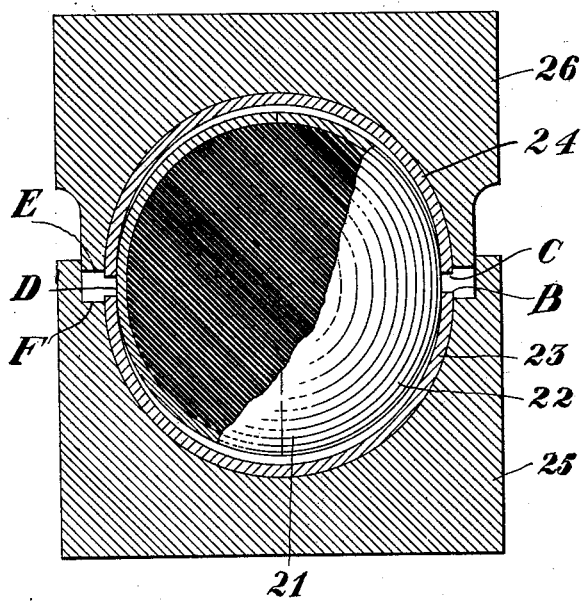
Fig. 3.
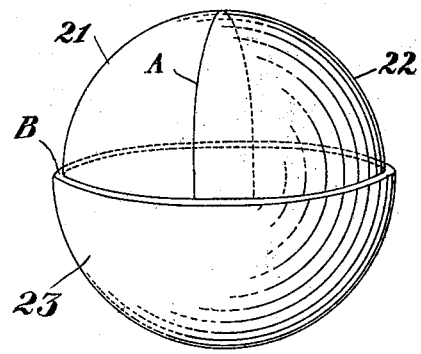
Witnesses:
Inventor:
Eleazer Kempshall
By his Attorney

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

PROCESS OF MANUFACTURING GOLF-BALLS.

SPECIFICATION forming part of Letters Patent No. 699,087, dated April 29, 1902.

Application filed March 12, 1902. Serial No. 97,881. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Processes of Manufacturing Golf-Balls, of which the following is a specification.

This invention relates to a process for the manufacture of playing-balls; and its chief object is to strengthen and improve the covers of balls which are subjected to severe usage, as in the game of golf.

In the accompanying drawings, Figure 1 is a view of my improved ball partly broken away, so as to exhibit its construction. Fig. 2 illustrates a stage in the process of covering the ball, and Fig. 3 illustrates the relative arrangement of jointed layers used in forming the cover.

In the several views similar parts are designated by similar characters of reference.

Upon a core 20 of suitable material, such as gutta-percha or soft rubber, I place hemispherical segments 21 and 22 of hard wear-resisting material—such, for instance, as celluloid—and this inner shell I inclose with an outer shell consisting of hemispherical segments 23 and 24, placing the latter so that the seam A between the inner segments extends transversely and preferably at right angles to the edges B and C of the outer segments. The ball thus formed or assembled I place between heating and forming dies 25 and 26, the edges B and C preferably being parallel with the lips E and F of the dies. The latter I bring together forcibly, thereby closing the outer shell upon the inner shell and joining the edges B and C of the former. The filling or core 20 is nearly the full size of the ball and is originally prepared somewhat oversize—that is, of a bulk too great for the capacity of the finished shell—and one of the objects of compressing the shell upon the filling is to place the latter in a state of normal compression, so as to increase the efficiency of the ball.

An advantage of my present improvements is that the material of the filling is prevented by the inner shell at D from squeezing out between the lips E and F of the dies. The heat renders the celluloid plastic, and the compression of the dies is maintained until the shell of the ball cools and hardens.

The heating of the dies renders the material of the shell layers plastic and enables the edges at A, as well as those at B and C, to weld, and owing to the crossing of the welds the danger of the ball bursting at a weld when subject to rough usage in play is avoided, since the body portion of one of the layers reinforces the weld portion of the other thereof, thereby making a practicably indestructible casing for the core. Moreover, the weld itself is improved in character in each layer by reason of the contiguity of the material of the other layer, the heating and pressure having a tendency to compact the material of both layers into one concrete thick shell. The pressure to which the shell is subjected tends also to compact, toughen, and temper the celluloid or other material, rendering it less liable to chip off and also more springy, tenacious, and durable. It will also be understood that celluloid in the form of thin layers, which I preferably use, has desirable qualities that are not so well marked when the celluloid is made up in thick layers, so that my laminated shell has the temper of thin celluloid, while also having enough body to furnish the necessary resistance to a blow. Either or both of the layers may, however, be incompletely cured or somewhat green, it being desirable that there shall be at least enough solvent present in the material to render the same plastic and weldable when heat is applied. Thus it will be seen that the ball at Fig. 1 comprises a solid core of gutta-percha, soft rubber, or suitable materials in combination compressed by a shell built up of layers of celluloid, each layer consisting of segments welded at their edges, the welds crossing, and said layers being further welded together or adhering facewise, thereby producing a shell practically as strong as a seamless shell, in the normal expansive tendency of the filling serving or aiding to maintain the true spherical form of the shell, and also aiding materially to restoring the ball to its true shape after a blow, thereby conducing to the flying power thereof. Moreover, by having the core in a state of initial compression less distortion of the ball under a blow occurs before the limit of compression is reached, whereby less force is wasted in changing and restoring the shape to the ball, so that nearly all of the force of the implement is utilized in speeding the ball.

It will be seen that one layer of the shell serves to reinforce the joint of the other layer, and it will be understood that such reinforcement not only enables the shell to withstand the normal expansive energy of the filling, but also prevents undue flexure and practically eliminates the danger of bursting at the joint.

It is to be understood that in case condensation of the core occurs at the compressing operation it is due to the presence of air-spaces or impurities in the material. It is not essential in practicing my invention that the core be always condensed in bulk, so long as when the ball is finished the core is gripped by the shell. This grip is made even more powerful by the shrinking of the celluloid, which continues for a long time after the ball is made.

I usually form the shell of golf-balls with a pebbled or brambled surface, as at G; but for other games the balls may be made with a smooth periphery.

As my improvements relate chiefly to an improvement in the shell, whereby it is adapted particularly for the purposes specified, I have illustrated the core 20 in the form of a solid sphere; but it may be otherwise formed and still be wholly or partly held under compression by the improved shell. I prefer to employ gutta-percha for at least a large portion of said core, although any other yielding backing may be employed for the shell, reducing the tendency of the latter to chip and also coöperating therewith to increase the efficiency of the ball. The shell I make relatively thin, so that it may possess a degree of flexibility, springiness, or temper not present in a solid or nearly solid ball of the same material, thus preserving the wear-resisting quality of the ball, while making it lively and efficient. So long as the shell is made up of wear-resisting material which is harder than the backing or filling it is not essential that said shell in all cases be made of celluloid. More than two plies of layers may be used for the shell within the scope of my invention. While I prefer celluloid for reinforcing the joint or weld between segments, other material may be employed within the scope of my invention, and while I prefer to reinforce one welded or jointed segmental shell by means of a like shell, still a reinforcement may be made by means of a shell otherwise formed and consisting of other substance.

In using the term "celluloid" I mean to include all components of the celluloid or pyroxylin class.

Having described my invention, I claim—

1. A process in producing a playing-ball, consisting in inclosing a spherical core in previously-formed segments of plastic material so as to make a shell consisting of a plurality of layers, the segments being so placed that the joint in one layer crosses the joint in another layer, and subjecting the ball thus formed or assembled to compression.

2. A process in producing a playing-ball, consisting in inclosing a spherical core in previously-formed segments of plastic material so as to make a shell consisting of a plurality of layers, the segments being so placed that the joint in one layer crosses the joint in another layer, bringing said layers to a plastic condition by means of heat, subjecting the whole to compression, and maintaining the compression while the shell cools and hardens.

3. A process in producing a playing-ball, consisting in inclosing a spherical core in previously-formed segments of celluloid so as to make a shell consisting of a plurality of layers, the segments being so placed that the joint in one layer crosses the joint in another layer, and subjecting the ball thus formed or assembled to compression.

4. A process in producing a playing-ball, consisting in inclosing a spherical core in previously-formed segments of celluloid so as to make a shell consisting of a plurality of layers, the segments being so placed that the joint in one layer crosses the joint in another layer, bringing said layers to a plastic condition by means of heat, subjecting the whole to compression, and maintaining the compression while the shell cools and hardens.

5. A process in producing a playing-ball, consisting in inclosing a spherical core of springy material in shell layers of plastic material, at least one of said layers being previously formed and consisting of spherical segments, bringing said layers to a plastic condition, subjecting the whole to compression to such an extent as to compress said core, and maintaining the compression while the shell hardens.

6. A process in producing a playing-ball, consisting in inclosing a spherical core consisting at least partially of gutta-percha in previously-formed segments of plastic material so as to make a shell consisting of a plurality of layers, the segments being so placed that the joint in one layer crosses the joint in another layer, subjecting the ball thus formed or assembled to compression to such an extent as to compress said core, and maintaining the compression until the shell hardens.

7. A process in producing a playing-ball, consisting in inclosing a spherical core of gutta-percha in previously-formed segments of plastic material so as to make a shell consisting of a plurality of layers, at least one of said layers consisting of celluloid, and the segments being so placed that the joint in one layer crosses the joint in another layer, bringing said layers to a plastic condition by means of heat, subjecting the whole to compression, and maintaining the compression while the shell cools and hardens.

8. A process in producing a playing-ball, consisting in inclosing a spherical core of gutta-percha in shell layers of celluloid, at least one of said layers being previously formed and consisting of spherical segments, bringing said layers to a plastic condition, subjecting the whole to compression, and maintaining the compression while the shell hardens.

9. A process in producing a playing-ball, consisting in inclosing a spherical core of gutta-percha in previously-formed segments consisting largely or wholly of celluloid so as to make a shell consisting of a plurality of layers, the segments being so placed that the joint in one layer crosses the joint in another layer, and subjecting the ball thus formed or assembled to compression.

10. A process in producing a playing-ball, consisting in inclosing a spherical core of gutta-percha in previously-formed segments of celluloid so as to make a shell consisting of a plurality of layers, the segments being so placed that the joint in one layer crosses the joint in another layer, bringing said layers to a plastic condition by means of heat, subjecting the whole to compression, and maintaining the compression while the shell cools and hardens.

ELEAZER KEMPSHALL.

Witnesses:
B. C. STICKNEY,
E. J. CLARKSON.